United States Patent
Shaposhnikov et al.

(10) Patent No.: US 11,649,324 B2
(45) Date of Patent: May 16, 2023

(54) HIGHLY PURE THIONATED POLYMERS

(71) Applicant: Brimstone Holding LLC, Washington, DC (US)

(72) Inventors: Dmitriy A. Shaposhnikov, Kazan (RU); Rinat R. Akhmetshin, Washington, DC (US)

(73) Assignee: Brimstone Holding LLC, Washington, DC (US)

( * ) Notice: Subject to any disclaimer, the term of this patent is extended or adjusted under 35 U.S.C. 154(b) by 303 days.

(21) Appl. No.: 16/772,375

(22) PCT Filed: Dec. 11, 2018

(86) PCT No.: PCT/US2018/064818
§ 371 (c)(1),
(2) Date: Jun. 12, 2020

(87) PCT Pub. No.: WO2019/118382
PCT Pub. Date: Jun. 20, 2019

(65) Prior Publication Data
US 2021/0355281 A1 Nov. 18, 2021

Related U.S. Application Data

(60) Provisional application No. 62/598,116, filed on Dec. 13, 2017.

(51) Int. Cl.
*C08G 75/14* (2006.01)
*C03C 17/32* (2006.01)
(Continued)

(52) U.S. Cl.
CPC .............. *C08G 75/14* (2013.01); *C03C 17/32* (2013.01); *C08J 5/18* (2013.01); *C08J 2481/04* (2013.01); *G02B 1/14* (2015.01)

(58) Field of Classification Search
CPC ........ C08G 75/14; C08G 75/02; C08G 75/12; C08G 75/04; C08G 75/16; C09J 181/02;
(Continued)

(56) References Cited

U.S. PATENT DOCUMENTS 3,933,749 A * 1/1976 Williams, III ..... C08G 73/1064
528/229
3,987,016 A * 10/1976 Haddad .............. C08G 75/0222
528/388

(Continued)

FOREIGN PATENT DOCUMENTS

WO WO 2013/023216 A1 2/2013
WO WO 2017/189953 A1 11/2017

OTHER PUBLICATIONS

International Patent Application No. PCT/US2018/064818; Invitation to Pay Additional Fees; dated Mar. 4, 2019; 2 pages.

(Continued)

*Primary Examiner* — Shane Fang
(74) *Attorney, Agent, or Firm* — BakerHostetler

(57) ABSTRACT

Provided are thionated polymers comprising one or more aromatic groups and at least one $S_x$ group, wherein x is 1-200, wherein the thionated polymer comprises about 50% by weight or less, based on the weight of the thionated polymer, of substituents on the backbone of the thionated polymer that absorb at a wavelength of about 700 to about 6200 nm. Also provided are substrates such as films, glass substrates, and optical devices comprising a thionated polymer and processes for preparing a thionated polymer described herein.

26 Claims, 1 Drawing Sheet

(51) Int. Cl.
*C08J 5/18* (2006.01)
*G02B 1/14* (2015.01)

(58) Field of Classification Search
CPC ..... C03C 17/32; C07C 321/18; C07C 323/14; C08J 5/18; C08J 2481/04; G02B 1/14
See application file for complete search history.

(56) References Cited

U.S. PATENT DOCUMENTS

| | | | |
|---|---|---|---|
| 4,629,778 A * | 12/1986 | Sugie | C08G 75/0231 528/388 |
| 2010/0059709 A1 | 3/2010 | Bachels et al. | |
| 2010/0133995 A1 | 6/2010 | Ohba et al. | |
| 2014/0199592 A1 * | 7/2014 | Pyun | H01M 4/0404 252/511 |
| 2016/0039957 A1 | 2/2016 | Al-Malki | |
| 2017/0240683 A1 | 8/2017 | Iijima et al. | |

OTHER PUBLICATIONS

International Patent Application No. PCT/US2018/064818; Int'l Search Report and the Written Opinion; dated Apr. 24, 2019; 18 pages.

International Patent Application No. PCT/US2018/064818; Int'l Preliminary Report on Patentability; dated Jun. 25, 2020; 8 pages.

Gabriel et al.; "Kilogram Scale Inverse Vulcanization of Elemental Sulfur to Prepare High Capacity Polymer Electrodes for Li-S Batteries"; Journal of Polymer Science Part A: Polymer Chemistry; vol. 53; 2015; p. 173-177.

Li et al.; "Catalyst-Free, Atom-Economic, Multicomponent Polymerizations of Aromatic Diynes, Elemental Sulfur, and Aliphatic Diamines toward Luminescent Polythioamides"; Macromolecules; vol. 48, 2015; p. 7747-7754.

Ding et al.; "Copolymerization of Elemental Sulfur with Cyclic (Arylene Disulfide) Oligomers"; Journal of Polymer Science: Part A: Polymer Chemistry; 1997; vol. 35; p. 2961-2968.

Shukla et al.; "Cardanol benzoxazine-Sulfur Copolymers for Li-S batteries: Symbiosis of Sustainability and Performance"; ChemistrySelect; vol. 3; 2016; p. 594-600.

Crockett M. P. et al.; Sulfur-Limonene Polysulfide: A Material Synthesized Entirely from Industrial By-Products and Its Use in Removing Toxic Metals from Water and Soil; Angewandte Chemie International Edition; vol. 55; 2016; p. 1714-1718.

Griebel et al.; "New infrared transmitting material via inverse vulcanization of elemental sulfur to prepare high refractive index polymers"; Advanced Materials; vol. 26; 2014; p. 3014-3018.

Griebel et al.; "Dynamic Covalent Polymers via Inverse Vulcanization of Elemental Sulfur for Healable Infrared Optical Materials"; ACS Macro Letter; vol. 4; 2015; p. 862-866.

Dirlam et al.; "Inverse vulcanization of elemental sulfur with 1,4-diphenylbutadiyne for cathode materials in Li-S batteries"; RSC Advances; vol. 5; 2015; p. 24718-24722.

* cited by examiner

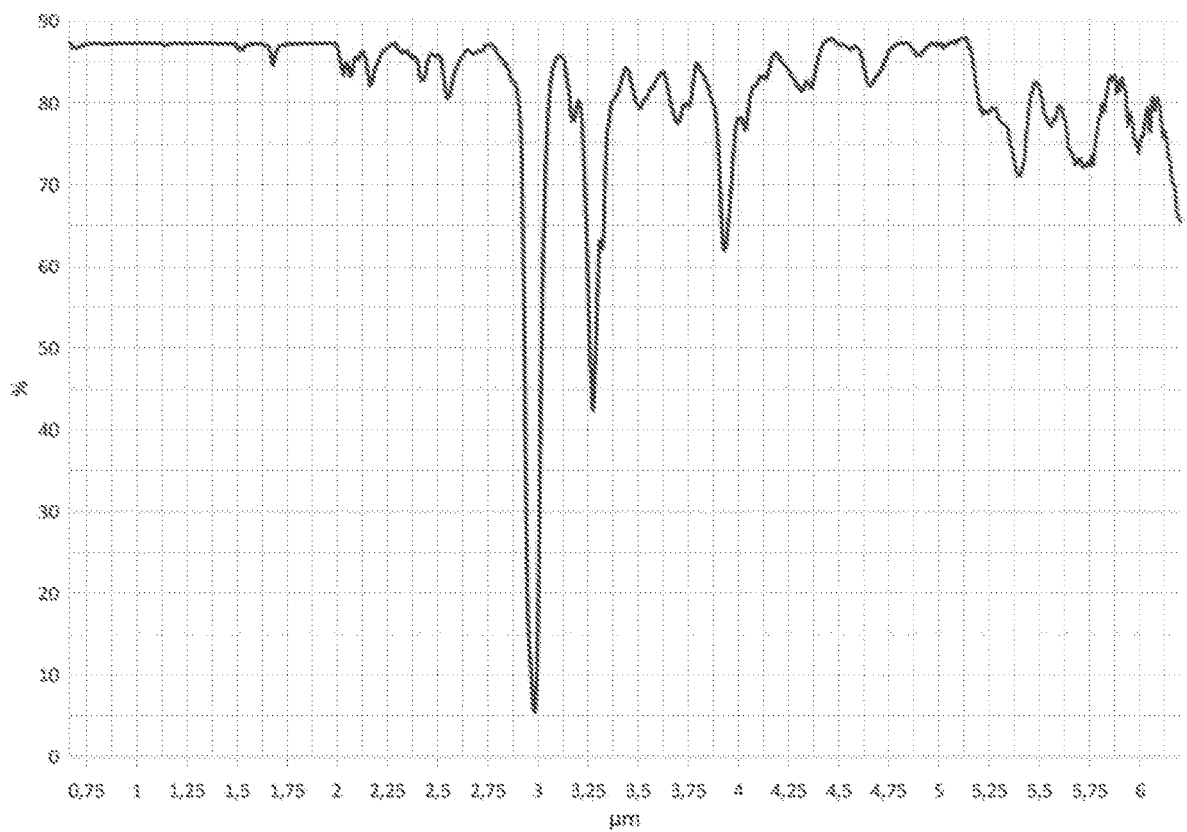

HIGHLY PURE THIONATED POLYMERS

CROSS-REFERENCE TO RELATED APPLICATIONS

This application is the National Stage of International Patent Application No. PCT/US2018/064818, filed Dec. 11, 2018, which claims priority to U.S. Provisional Patent Application No. 62/598,116, filed Dec. 13, 2017, the disclosures of each of which are incorporated herein by reference in their entireties for any and all purposes.

TECHNICAL FIELD

The disclosure is related to thionated polymers comprising aromatic groups and sulfur.

BACKGROUND

Polysulfide materials with high sulfur content are known and obtained using cyclic arylenedisulfides and sulfur. Cyclic aryleneoligosulfide oligomers are obtained from 4,4'-isopropylidene-bis-benzene-thiol and 4,4'-thiobis(benzenethiol) using copper salt as catalyst. However, this synthesis and separation of the aromatic derivatives by-products containing several sulfide or thiol groups are difficult. Furthermore, the synthesis requires two consecutive stages, which significantly hinders the use of this process on an industrial scale. The reagents are expensive and the synthetic process is labor and time consuming.

Other processes entailed preparing copolymers with high sulfur content were have been obtained via copolymerization of sulfur and limonene. However, the presence of alkyl fragments on the limonene backbone significantly lowers transparency of the final product in the region of the near infrared region.

What is needed are thionated polymers which are substantially transparent in the near IR region, but lack impurities, such as alkyl or alkylidene impurities, that absorb in the near-IR region.

SUMMARY

The present disclosure provides thionated polymers, comprising one or more aromatic groups and at least one $S_x$ group, wherein x is 1-200, wherein the thionated polymer comprises about 50% by weight, based on the weight of the thionated polymer, or less of substituents on the backbone of the thionated polymer that absorb light at a wavelength of about 700 to about 6200 nm. In some aspects, the thionated polymer is substantially transparent to light at a wavelength of about 700 to about 6200 nm.

The present disclosure also provides thionated polymers, comprising one or more aromatic groups and at least one $S_x$ group, wherein x is 1-200, wherein the thionated polymer comprises about 50% by weight, based on the weight of the thionated polymer, or less of substituents on the backbone of the thionated polymer that absorb light at a wavelength of about 950 to about 5500 nm. In some aspects, the thionated polymer is substantially transparent to light at a wavelength of about 950 to about 5500 nm.

The disclosure also provides films or compositions comprising a thionated polymer as described herein.

The disclosure further provides glass substrates comprising a film described herein.

The disclosure also provides optical devices comprising a thionated polymer, composition, film, or glass substrate described herein.

The disclosure further provides processes for preparing thionated polymers described herein, comprising (a) oxidizing a monomer or oligomer comprising one or more aromatic groups; and (b) reducing the product of step (a) with a sulfur source.

Other aspects and embodiments of the invention will be readily apparent from the following detailed description of the invention.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific compositions, methods, devices, and systems disclosed. In addition, the drawings are not necessarily drawn to scale.

The FIGURE is the IR absorption spectrum of the compound of example 1.

DETAILED DESCRIPTION OF ILLUSTRATIVE EMBODIMENTS

In the present disclosure the singular forms "a", "an" and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about" or "substantially" it will be understood that the particular value forms another embodiment. In general, use of the term "about" or "substantially" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about" or "substantially." In other cases, the gradations used in a series of values may be used to determine the intended range available to the term "about" or "substantially" for each value. Where present, all ranges are inclusive and combinable. That is, references to values stated in ranges include every value within that range.

When a list is presented, unless stated otherwise, it is to be understood that each individual element of that list and every combination of that list is to be interpreted as a separate embodiment. For example, a list of embodiments presented as "A, B, or C" is to be interpreted as including the embodiments, "A," "B," "C," "A or B," "A or C," "B or C," or "A, B, or C."

It is to be appreciated that certain features of the invention which are, for clarity, described herein in the context of separate embodiments, may also be provided in combination in a single embodiment. That is, unless obviously incompatible or excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Finally, while an embodiment may be described as part of a series of steps or part of a more general structure, each said step may also be considered an independent embodiment in itself.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are described herein.

The term "polymer" as used herein refers to a large chemical compound containing repeating units comprising monomers and/or oligomers. In some embodiments, the polymers contain monomers and/or oligomers that are arranged in a linear form. In other embodiments, the polymers contain monomers and/or oligomer that are cross-linked. In further embodiments, the polymers contain some monomers and/or oligomers that are arranged in a linear form and some monomers and/or oligomers that are cross-linked. In further embodiments, the polymers contain at least about 50% by weight, based on the weight of the thionated polymer, of cross-linking. In still further embodiments, the polymers contain about 50% to about 100% of cross-linking, such as about 55% to about 90%, about 60% to about 85%, about 70% to about 80%, about 75% to about 95%, about 80% to about 90% by weight of cross-linking.

The term "light" as used herein refers to infrared (including near-infrared), visible, ultraviolet light, or any combinations thereof. Visible light refers to that portion of the electromagnetic spectrum that is visible to or can be detected by the human eye, typically wavelengths from about 390 to about 700 nm. Infrared light is that light having wavelengths higher than the high end of this range (i.e., about 700 nm to about 1 mm) and ultraviolet refers to light having wavelengths at wavelengths lower than the low end of this range (i.e., about 10 to about 400 nm).

As used herein, the term "absorb" refers to the physical process of a chemical compound absorbing light. In some embodiments, "absorb" refers to the process of the thionated polymers described herein to absorb light. In other embodiments, "absorb" refers to the process of one or more impurity described herein to absorb light. Simplistically, "absorb" can be quantitated by the amount of light that is passed through a chemical compound.

The term "transparent" as used herein refers to the property of the thionated polymers and impurities described herein to absorb light without scattering. Thus, the transparency of the thionated polymers and impurities is directly proportional to their ability to absorb light, i.e., to their absorbance. By way of example, a chemical compound that is substantially transparent absorbs about 90, about 95, or about 100% of the light that contacts the chemical compound. The absorbance or transparency of a chemical compound may be measured using skill and techniques known in the art including, without limitation, absorbance spectroscopy using an infrared or near-infrared spectrophotometer. The absorbance or transparency is also related to the thickness of a measure sample of the thionated polymer. Specifically, the absorbance of the thionated polymer increases as the thickness of the thionated polymer increases. On the contrary, the transparency of the thionated polymer decreases as the thickness of the thionated polymer increases. Thus, in some embodiments, about 0.1 to about 100% of light passes through a sample of the thionated polymer at a sample thickness of about 0.001 mm to about 4 mm, as measured by FT-IR absorbance. In other embodiments, about 10 to about 100%, about 20 to about 100%, about 20 to about 100%, about 30 to about 100%, about 40 to about 100%, about 50 to about 100%, about 60 to about 100%, about 70 to about 100%, about 80 to about 100%, about 90 to about 100%, about 95 to about 100%, about 99 to about 100%, or about 100% of light passes through the thionated polymer sample at a sample thickness of about 0.001 mm to about 4 mm, about 0.1 mm to about 4 mm, about 1 mm to about 4 mm, about 2 mm to about 4 mm, about 3 mm to about 4 mm, about 1 mm, about 2 mm, about 3 mm, or about 4 mm, as measured by FT-IR absorbance.

I. THE THIONATED POLYMER

The inventors found that the thionated polymers prepared in the art had several significant disadvantages. First, the organic compounds, i.e., monomers and/or oligomers, used in the copolymerization contained substituents (e.g., limonene or substituents such as oxiranyl, thiiranyl, alkenyl, or alkyl groups), which themselves reacted with sulfur and formed alkyl or alkylidene fragment by-products. These fragment by-products were covalently bound to the resulting thionated polymer backbone and were intensively absorbing in the near IR region. Further, the polymer prepared using these materials were linear, lacked desirable cross-linking, and had low glass-transition temperatures. Thus, the thionated polymers have improved transparency in near infrared region transmitting properties.

In designing thionated polymers lacking groups which do not absorb in the near-IR region, the inventors created thionated materials that are substantially transparent in the near IR-region. In some embodiments, the thionated polymers are more pure and durable. Furthermore, the synthetic routes described herein use low cost starting materials and are less labor-intensive, including the use of fewer steps, than the processes in the art. The thionated polymers prepared as described herein also are prepared in higher yields than those in the art and with a higher sulfur content. In designing thionated polymers which lack one or more components that absorb in near-infrared region groups, the inventors created thionated materials that are transparent in the near IR-region.

Desirably, the thionated polymers are highly pure. The term "pure" as used herein to describe the thionated polymer refers to the substantial absence of one or more impurities. In some embodiments, the impurity is a thionated polymer that contains one or more chemical groups that is bound to the polymer backbone and absorbs in the near-IR region. In other embodiments, the impurity is one or more unreacted starting reagent (oligomer, monomer, or $S_x$ reagent) or fragment thereof. In further embodiments, the thionated polymer product lacks alkyl or alkylidene substituents which strongly absorb in near infrared range, and lack impurities, such as unreacted sulfur sources, e.g., elemental sulfur, and unreacted organic compounds. In yet other embodiments, at least about 50% by weight, at least about 60% by weight, at least about 70% by weight, at least about 80% by weight, at least about 90% by weight, or at least about 95% by weight, based on the weight of the thionated polymer, of the thionated polymer lacks groups which strongly absorb in the near infrared range, e.g., alkyl or alkylidene groups. In still further embodiments, no more than about 50% by weight, no more than about 40% by weight, no more than about 30% by weight, no more than about 20% by weight, no more than 10% by weight, or no more than 5% by weight, based on the weight of the thionated polymer, of the thionated polymer contains groups which strongly absorb in the near infrared range, e.g., alkyl or alkylidene groups. Thus, the oligomers utilized to prepare the thionated polymer contain about 50% by weight or less, about 40% by weight or less, about 30% by weight or less, about 20% by weight or less, about 10% by weight or less, about 5% or less, or about 1% or less of groups which strongly absorb in the near infrared range, e.g., alkyl or alkylidene groups.

These impurities affect or interfere with the transparency of the thionated polymer. In some embodiments, the impurity absorbs in the near-IR region. In further embodiments, the thionated polymers scatter light. Desirably, the thionated polymers comprise about 5% by weight or less, based on the weight of the thionated polymer, of a thionated impurity. In other embodiments, the thionated polymers comprise about 4% or less, about 3% or less, about 2% or less, about 1% or less, or about 0.5% by weight or less of a thionated impurity. In overcoming the deficiencies in the art, the present disclosure provides novel thionated polymers. The polymer comprises one or more aromatic groups and at least one $S_x$ group, wherein x is 1 to about 200. The term "$S_x$" as used herein refers to a linear string of one or more sulfur atoms. In some embodiments, x is 1 to about 100, 1 to about 50, about 5 to about 10, about 6 to about 20, or about 6 to about 8. In other embodiments, the $S_x$ group is a $S_8$ group. In further embodiments, the $S_x$ group is a linear $S_8$ group. However, the particular form of the $S_x$ is not a limitation of the present invention. Thus, the thionated polymer may contain different forms of $S_x$ groups.

In some embodiments, the impurity is a by-product that is formed during the polymerization. In other embodiments, the impurity is $H_2S_x$. In further embodiments, the impurity is unreacted elemental sulfur. In further embodiments, the impurity is thionated. In other embodiments, the impurity is a substituent of a starting material that has been thionated. In yet further embodiments, the impurity is a reagent utilized during the polymerization, i.e., an unreacted starting reagent such as the oligomer or monomer. In still other embodiments, the impurity is a thionated polymer which contains an alkyl group, alkylidene group, or combination thereof. In further embodiments, the impurity is an unreacted oligomer or monomer containing an alkyl group, alkylidene group, or combination thereof.

The $S_x$ group typically bridges two or more aromatic groups. In some embodiments, the $S_x$ groups bridges two aromatic groups. In other embodiments, the $S_x$ group bridges three aromatic groups. In further embodiments the $S_x$ group bridges four aromatic groups. The $S_x$ group may also be present in the polymer as a terminal group, i.e., bound to only one aromatic group.

The thionated polymer also contains an aromatic group. The term "aromatic" as used herein refers to a cyclic hydrocarbon containing sigma bonds and delocalized pi electrons between carbon atoms. In some embodiments, the term "aromatic" includes moieties containing only carbon and hydrogen. Thus, the aromatic group may include an aryl group. The term "aryl" as used herein refers to 6-15 membered monocyclic, bicyclic, or tricyclic hydrocarbon ring systems, including bridged, spiro, and/or fused ring systems, in which at least one of the rings is aromatic. An aryl group may contain 6 (i.e., phenyl) or about 9 to about 15 ring atoms, such as about 6 to about 8 ring atoms or about 9 to about 11 ring atoms. In some embodiments, the aryl group includes, but is not limited to, naphthyl, indanyl, indenyl, anthryl, phenanthryl, fluorenyl, 1,2,3,4-tetrahydronaphthalenyl, 6,7,8,9-tetrahydro-5H-benzocycloheptenyl, and 6,7,8,9-tetrahydro-5H-benzocycloheptenyl. In other embodiments, the aromatic group is a phenyl, naphthyl, anthryl, or fluorenyl.

In other embodiments, the term "aromatic" includes cyclic moieties containing carbon, hydrogen, and a heteroatom such as oxygen, nitrogen, sulfur, or combinations thereof. Thus, the aromatic group may include a heteroaryl group. The term "heteroaryl" as used herein refers to an aromatic ring (e.g., $C_{5-18}$heteroaryl) that includes one or more ring heteroatoms selected from nitrogen, oxygen and sulfur in the backbone of the ring. A heteroaryl group may contain about 5 to about 18 ring atoms, about 9 to about 15 ring atoms, about 6 to about 8 ring atoms, about 5 to about 7 ring atoms, or about 9 to about 11 ring atoms. In some embodiments, the heteroaryl is monocyclic, bicyclic, tricyclic, or tetracyclic. In other embodiments, the heteroatom(s) in the heteroaryl are optionally oxidized. The heteroaryl may be attached to the rest of the molecule through any atom of the ring(s). In some embodiments, the heteroaryl has 3 to about 18 ring atoms. In some embodiments, heteroaryl groups include 4 to about 8 ring atoms. Examples of heteroaryls include, but are not limited to, azepinyl, acridinyl, benzimidazolyl, benzindolyl, 1,3-benzodioxolyl, benzofuranyl, benzooxazolyl, benzo[d]thiazolyl, benzothiadiazolyl, benzo[b][1,4]dioxepinyl, benzo[b][1,4]oxazinyl, 1,4-benzodioxanyl, benzonaphthofuranyl, benzoxazolyl, benzodioxolyl, benzodioxinyl, benzoxazolyl, benzopyranyl, benzopyranonyl, benzofuranyl, benzofuranonyl, benzofurazanyl, benzothiazolyl, benzothienyl (benzothiophenyl), benzothieno[3,2-d]pyrimidinyl, benzotriazolyl, benzo[4,6]imidazo[1,2-a]pyridinyl, carbazolyl, cinnolinyl, cyclopenta[d]pyrimidinyl, 6,7-dihydro-5H-cyclopenta[4,5]thieno[2,3-d]pyrimidinyl, 5,6-dihydrobenzo[h]quinazolinyl, 5,6-dihydrobenzo[h]cinnolinyl, 6,7-dihydro-5H-benzo[6,7]cyclohepta[1,2-c]pyridazinyl, dibenzofuranyl, dibenzothiophenyl, furanyl, furazanyl, furanonyl, furo[3,2-c]pyridinyl, 5,6,7,8,9,10-hexahydrocycloocta[d]pyrimidinyl, 5,6,7,8,9,10-hexahydrocycloocta[d]pyridazinyl, 5,6,7,8,9,10-hexahydrocycloocta[d]pyridinyl, isothiazolyl, imidazolyl, indazolyl, indolyl, indazolyl, isoindolyl, indolinyl, isoindolinyl, isoquinolyl, indolizinyl, isoxazolyl, 5,8-methano-5,6,7,8-tetrahydroquinazolinyl, naphthyridinyl, 1,6-naphthyridinonyl, oxadiazolyl, 2-oxoazepinyl, oxazolyl, oxiranyl, 5,6,6a,7,8,9,10,10a-octahydrobenzo[h]quinazolinyl, 1-phenyl-1H-pyrrolyl, phenazinyl, phenothiazinyl, phenoxazinyl, phthalazinyl, pteridinyl, purinyl, pyranyl, pyrrolyl, pyrazolyl, pyrazolo[3,4-d]pyrimidinyl, pyridinyl, pyrido[3,2-d]pyrimidinyl, pyrido[3,4-d]pyrimidinyl, pyrazinyl, pyrimidinyl, pyridazinyl, pyrrolyl, quinazolinyl, quinoxalinyl, quinolinyl, isoquinolinyl, tetrahydroquinolinyl, 5,6,7,8-tetrahydroquinazolinyl, 5,6,7,8-tetrahydrobenzo[4,5]thieno[2,3-d]pyrimidinyl, 6,7,8,9-tetrahydro-5H-cyclohepta[4,5]thieno[2,3-d]pyrimidinyl, 5,6,7,8-tetrahydropyrido[4,5-c]pyridazinyl, thiazolyl, thiadiazolyl, thiapyranyl, triazolyl, tetrazolyl, triazinyl, thieno[2,3-d]pyrimidinyl, thieno[3,2-d]pyrimidinyl, thieno[2,3-c]pyridinyl, and thiophenyl (i.e. thienyl). In some embodiments, the aromatic group is azaindolyl, benzo(b)thienyl, benzimidazolyl, benzofuranyl, benzoxazolyl, benzothiazolyl, benzothiadiazolyl, benzotriazolyl, benzoxadiazolyl, furanyl, imidazolyl, imidazopyridinyl, indolyl, indolinyl, indazolyl, isoindolinyl, isoxazolyl, isothiazolyl, isoquinolinyl, oxadiazolyl, oxazolyl, purinyl, pyranyl, pyrazinyl, pyrazolyl, pyridinyl, pyrimidinyl, pyrrolyl, pyrrolo[2,3-d]pyrimidinyl, pyrazolo[3,4-d]pyrimidinyl, quinolinyl, quinazolinyl, triazolyl, thiazolyl, thiophenyl, tetrahydroindolyl, tetrazolyl, thiadiazolyl, thienyl, thiomorpholinyl, triazolyl, or tropanyl.

The thionated polymer may also contain aryl and heteroaryl groups such as any mixture of those described above.

In some embodiments, the thionated polymer contains an aromatic group of formula (III):

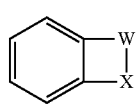

(III)

In this structure, W—X comprises a 4 to 10-membered carbon-based ring comprising 0-3 heteroatoms. In some embodiments, W and X are, independently, —C($R^4$)—, —C($R^4$)$_2$—C($R^4$)$_2$—, —C($R^4$)$_2$—C($R^4$)=C($R^4$)—, —N($R^4$)—, —N($R^4$)—C($R^4$)—, —N($R^4$)—C($R^4$)—C($R^4$)—, —N($R^4$)—C($R^4$)=C($R^4$)—, —O—, —S—, —O—C($R^4$)$_2$—, —S—C($R^4$)$_2$—, —O—C($R^4$)$_2$—C($R^4$)$_2$—, —S—C($R^4$)$_2$—C($R^4$)$_2$—, —O—C($R^4$)=C($R^4$)—, or —S—C($R^4$)=C($R^4$)—, wherein each $R^4$ is, independently, H, aryl, or heteroaryl. In other embodiments, any position on the compound of formula (III) is optionally substituted with an aromatic substituent as described below. In other embodiments, W—X is fused with a second aromatic group to form a structure having 3 rings. In some embodiments, the 3 ring structure is fully aromatic.

In other embodiments, the aromatic group is:

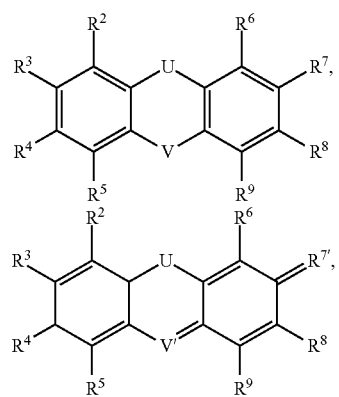

or a combination thereof.

In these structures, U and V are, independently, CH$_2$, O, S, or NH and V is CH or N. In some embodiments, U and V or U and V are the same. In other embodiments, U and V or U and V' differ. In further embodiments, U is CH$_2$. In other embodiments, U is O. In further embodiments, U is S. In still other embodiments U is NH. In further embodiments, V is CH$_2$. In other embodiments, V is O. In further embodiments, V is S. In still other embodiments V is NH. In yet further embodiments, V is CH. In other embodiments, V is N. In still further embodiments, U is S and V is CH$_2$. In other embodiments, U is S and V is NH. $R^2$ to $R^9$ are, independently, H, aryl, or heteroaryl and $R^{7'}$ is aryl or heteroaryl. In some embodiments, $R^2$ to $R^9$ are H. In other embodiments, at least one of $R^2$ to $R^9$ is aryl. In further embodiments, at least one of $R^2$ to $R^9$ is heteroaryl.

The thionated polymers described herein are transparent to light at a wavelength of about 700 to about 6200 nm, i.e., about 700, about 800, about 900, about 1000, about 1110, about 1200, about 1300, about 1400, about 1500, about 1600, about 1700, about 1800, about 1900, about 2000, about 2100, about 2200, about 2300, about 2400, about 2500, about 2600, about 2700, about 2800, about 2900, about 3000, about 3100, about 3200, about 3300, about 3400, about 3500, about 3600, about 3700, about 3800, about 3900, about 4000, about 4100, about 4200, about 4300, about 4400, about 4500, about 4600, about 4700, about 4800, about 4900, about 5000, about 5100, about 5200, about 5300, about 5400, about 5500, about 5600, about 5700, about 5800, about 5900, about 6000, about 6100, or about 6200 nn, or ranges there between. In some embodiments, the thionated polymers are transparent to light in the near-IR range. In further embodiments, the thionated polymers are transparent to light at a wavelength of about 700 to about 6200 nm, about 725 to about 6000 nm, about 750 to about 5800 nm, about 775 to about 5600 nm, about 800 to about 5400 nm, about 825 to about 5200 nm, about 850 to about 5000 nm, about 875 to about 4800 nm, about 900 to about 4600 nm, or about 925 nm to about 400 nm. In other embodiments, the thionated polymers are transparent to light at a wavelength of about 950 to about 4500 nm, about 700 to about 4500 nm, about 950 to about 2650 nm, about 700 to about 2650 nm, about 700 to about 5000 nm, or about 950 to about 5000 nm.

The molecular weight of the thionated polymer depends on the monomer or oligomer utilized in the polymerization. In some embodiments, the $M_w$ of the thionated polymer is about 500 to about 10,000,000 daltons. In other embodiments, the $M_w$ of the thionated polymer is about 1,000 to about 10,000,000 daltons. The weight average molecular weight ($M_w$) may be determined by gel permeation chromatography or size exclusion chromatography using the following formula:

$$Mw = \frac{\sum N_i M_i^2}{\sum N_i M_i}$$

where: $M_i$ is the molecular weight of a chain and $N_i$ is the number of chains of that molecular weight.

When the thionated polymer is prepared using oligomers, the molecular weight of the oligomers is about 190 to about 2000 daltons. In other embodiments, the molecular weight of each monomer is about 190 to about 750 daltons, about 340 to about 650 daltons, about 200 to about 600 daltons, about 250 to about 550 daltons, about 300 to about 500 daltons, about 190 to about 500 daltons, about 190 to about 250 daltons.

When the thionated polymer is prepared using monomers, the molecular weight of the monomer is about 150 to about 1000 daltons. In other embodiments, the molecular weight of each monomer is about 150 to about 750 daltons, about 150 to about 650 daltons, about 200 to about 600 daltons, about 250 to about 550 daltons, about 300 to about 500 daltons, about 150 to about 500 daltons, about 170 to about 250 daltons, or about 1700 to about 200 daltons.

The aromatic groups may also contain substituents. Such substituents are located along the backbone of the aromatic group. The substitution may be on any carbon-atom or heteroatom of the aromatic group, as permitted by the stability and valency of the relevant substituent. In some embodiments, the substituent does not absorb light in the near-IR region. In other embodiments, the substituent absorbs less than about 5%, less than about 4%, less than about 3%, less than about 2%, or less than about 1% of light in the near-IR region. In further embodiments, the substituent is an aromatic substituent. The aromatic substituent may contain only carbon and hydrogen or the aromatic substituent may contain carbon, hydrogen, and one or more heteroatom such as oxygen, nitrogen, sulfur, or combinations thereof. In yet other embodiments, the substituent is a halogen or a perhalogenated alkyl. In some embodiments, the aromatic substituent is an aryl, heteroaryl, or combination thereof as described above for the aromatic group. In other embodiments, the aromatic substituent is an aryl. In further embodiments, the aromatic substituent is a heteroaryl. In yet other embodiments, the aromatic substituent is contains one or more of O, S, or $NR^B$, wherein $R^B$ is aryl or heteroaryl.

The aromatic substituent may also be bound to the aromatic group through a linking moiety. One of skill in the art would be able to select a suitable linking group based on the aromatic group and aromatic substituent. Desirably, the linking group does not react with the $S_x$ reagent to form an impurity that absorbs in the near-IR region. Thus, in some embodiments, the linking group contains oxygen, sulfur, nitrogen, or phosphorus. In further embodiments, the linking group is $X^1$, wherein $X^1$ is O, S, $NR^1$, $PO_3$, or $PR^3$, $R^1$ is aryl or heteroaryl and $R^2$ is H or $C_{1-6}$alkyl. By doing so, the substituent may be $X^1$-aryl or $X^1$-heteroaryl. In some embodiments, $X^1$ is O. In other embodiments, $X^1$ is S. In further embodiments, $X^1$ is $NR^1$ and $R^1$ is aryl. In yet other embodiments, $X^1$ is $NR^2$ and $R^2$ is heteroaryl.

The thionated polymer desirably lacks one or more substituents on the backbone of the thionated polymer that absorb at a wavelength of about 700 to about 6200 nm, or about 950 to about 5500 nm. In some embodiments, the thionated polymer lacks fully saturated substituents. The term "fully saturated" as used herein refers to a chemical moiety that comprises atoms that are linked together by single bonds and cannot transform to an unsaturated moiety upon reaction with sulfur. Examples of "fully saturated" chemical moieties include, without limitation, aliphatic groups such as alkyl, hydroxyalkyl, alkoxy, and alkanoic acids. The term "acyclic" as used herein refers to a chemical moiety that is an open-chain compound. Examples of "acyclic" moieties refers to aliphatic groups such as alkyl or alkoxy.

In some aspects, the thionated polymer is of formula (IV):

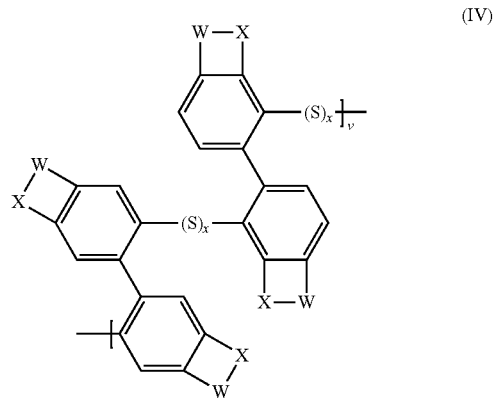

(IV)

In this structure, v is 2 to about 200 and W, X, and x are defined above. In some embodiments, v is 2 to about 100. In other embodiments, v is 2 to about 50. In further embodiments, v is 5 to 100. In yet other embodiments, v is 10 to about 50.

In other aspects, the thionated polymer is of formula (V):

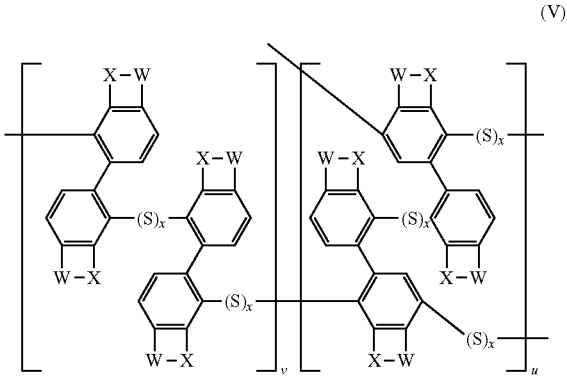

(V)

In this structure, v is 2 to about 500, u is about 2 to about 500, and W, X, and x are defined above. In some embodiments, v is 2 to about 400, 2 to about 300, 2 to about 200, 2 to about 100, about 5 to about 500, about 5 to about 400, about 5 to about 300, about 5 to about 200, about 5 to about 100, about 10 to about 500, about 10 to about 400, about 10 to about 300, about 10 to about 200, about 10 to about 100, about 10 to about 50, about 25 to about 250, about 30 to about 300, about 40 to about 400, about 100 to about 500, about 100 to about 400, about 100 to about 300, or about 250 to about 500. In other embodiments, u is 2 to about 400, 2 to about 300, 2 to about 200, 2 to about 100, about 5 to about 500, about 5 to about 400, about 5 to about 300, about 5 to about 200, about 5 to about 100, about 10 to about 500, about 10 to about 400, about 10 to about 300, about 10 to about 200, about 10 to about 100, about 10 to about 50, about 25 to about 250, about 30 to about 300, about 40 to about 400, about 100 to about 500, about 100 to about 400, about 100 to about 300, or about 250 to about 500.

In further aspects, the thionated polymer is of formula (VI):

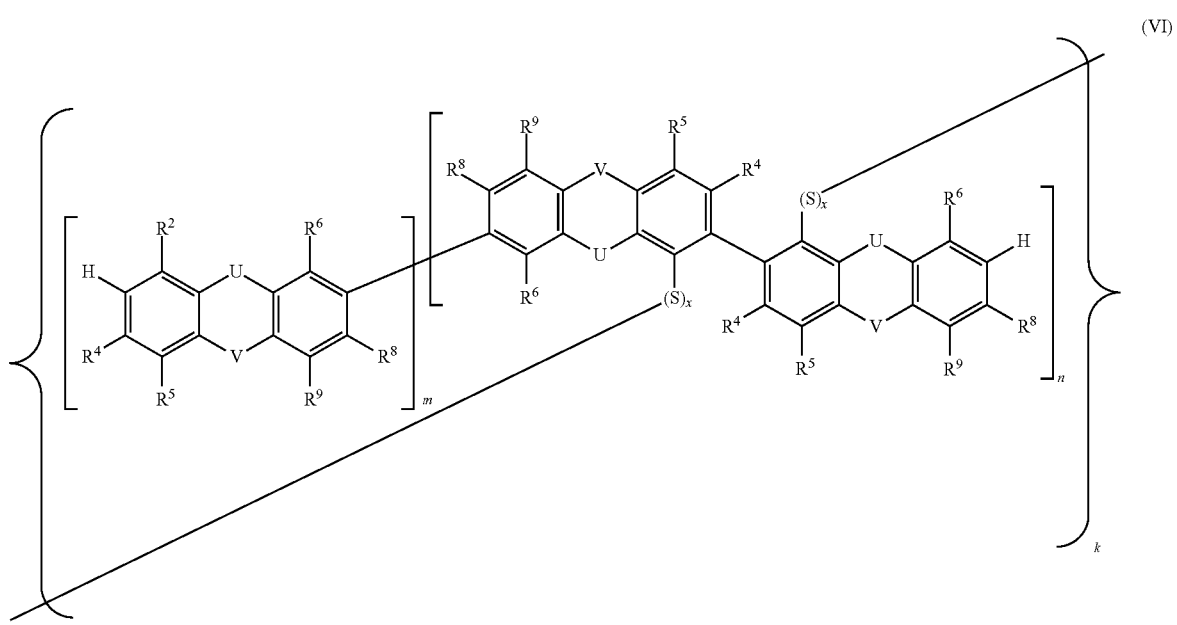

In the structure of formula (VI), U and V are, independently, $CH_2$, O, S, or NH and V is CH or N. In some embodiments, U and V or U and V are the same. In other embodiments, U and V or U and V differ. In further embodiments, U is $CH_2$. In other embodiments, U is O. In further embodiments, U is S. In still other embodiments U is NH. In further embodiments, V is $CH_2$. In other embodiments, V is O. In further embodiments, V is S. In still other embodiments V is NH. In yet further embodiments, V is CH. In other embodiments, V' is N. In still further embodiments, U is S and V is $CH_2$. In other embodiments, U is S and V is NH. $R^2$ to $R^9$ are, independently, H, aryl, or heteroaryl. In some embodiments, $R^2$ to $R^9$ are H. In other embodiments, at least one of $R^2$ to $R^9$ is aryl. In further embodiments, at least one of $R^2$ to $R^9$ is heteroaryl. n is 2 to about 1,000 such as 2 to about 750, 2 to about 500, 2 to about 250, 2 to about 100, about 10 to about 1,000, about 10 to about 750, about 10 to about 500, about 10 to about 250, about 50 to about 1,000, about 50 to about 750, about 50 to about 500, about 50 to about 250, about 100 to about 1,000, about 100 to about 750, about 100 to about 500, about 100 to about 250, or about 250 to about 1,000. m is 2 to about 1,000 such as 2 to about 750, 2 to about 500, 2 to about 250, 2 to about 100, about 10 to about 1,000, about 10 to about 750, about 10 to about 500, about 10 to about 250, about 50 to about 1,000, about 50 to about 750, about 50 to about 500, about 50 to about 250, about 100 to about 1,000, about 100 to about 750, about 100 to about 500, about 100 to about 250, or about 250 to about 1,000. k is 2 to about 1,000 such as 2 to about 750, 2 to about 500, 2 to about 250, 2 to about 100, about 10 to about 1,000, about 10 to about 750, about 10 to about 500, about 10 to about 250, about 50 to about 1,000, about 50 to about 750, about 50 to about 500, about 50 to about 250, about 100 to about 1,000, about 100 to about 750, about 100 to about 500, about 100 to about 250, or about 250 to about 1,000.

In yet other aspects, the thionated polymer is of formula (VII):

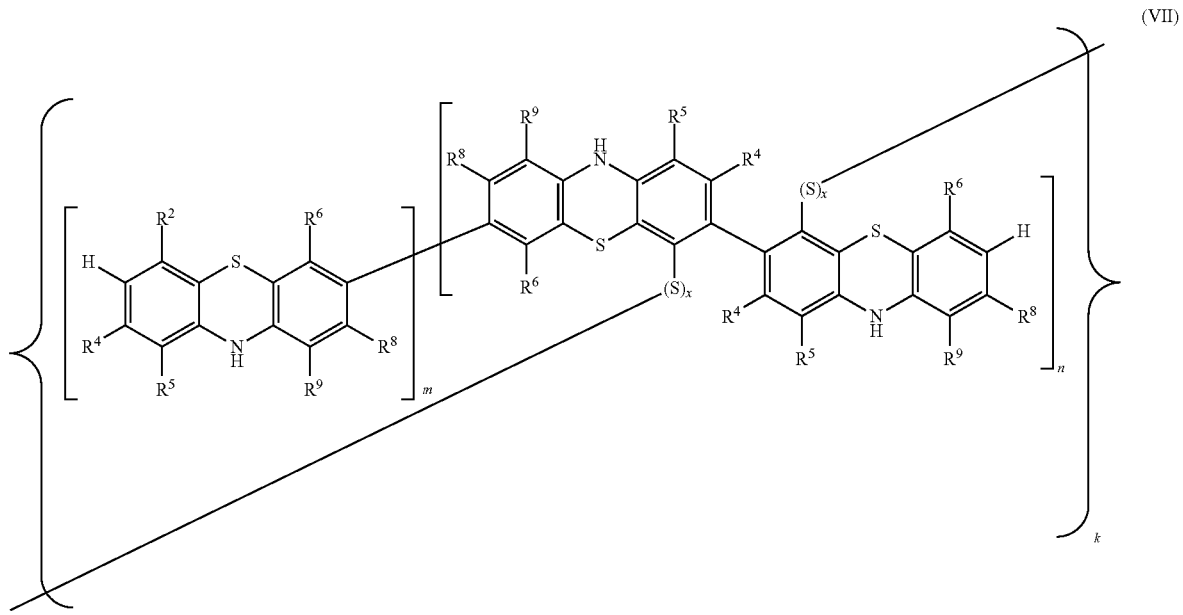

In this structure, $R^2$, $R^4$-$R^6$, $R^8$, and $R^9$ are defined above. n is 2 to about 1,000 such as 2 to about 750, 2 to about 500, 2 to about 250, 2 to about 100, about 10 to about 1,000, about 10 to about 750, about 10 to about 500, about 10 to about 250, about 50 to about 1,000, about 50 to about 750, about 50 to about 500, about 50 to about 250, about 100 to about 1,000, about 100 to about 750, about 100 to about 500, about 100 to about 250, or about 250 to about 1,000. m is 2 to about 1,000 such as 2 to about 750, 2 to about 500, 2 to about 250, 2 to about 100, about 10 to about 1,000, about 10 to about 750, about 10 to about 500, about 10 to about 250, about 50 to about 1,000, about 50 to about 750, about 50 to about 500, about 50 to about 250, about 100 to about 1,000, about 100 to about 750, about 100 to about 500, about 100 to about 250, or about 250 to about 1,000. k is 2 to about 1,000 such as 2 to about 750, 2 to about 500, 2 to about 250, 2 to about 100, about 10 to about 1,000, about 10 to about 750, about 10 to about 500, about 10 to about 250, about 50 to about 1,000, about 50 to about 750, about 50 to about 500, about 50 to about 250, about 100 to about 1,000, about 100 to about 750, about 100 to about 500, about 100 to about 250, or about 250 to about 1,000.

In still further aspects, the thionated polymer is of formula (VIII):

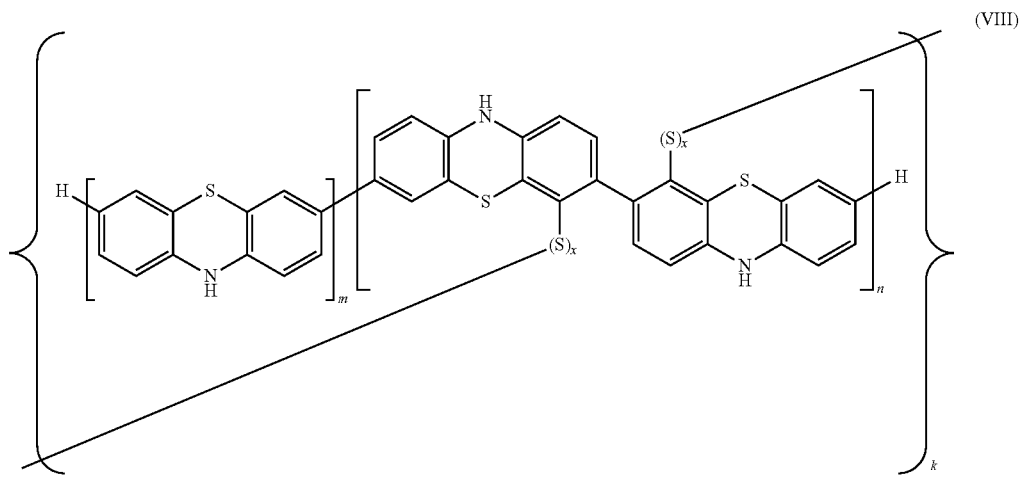

In this structure, x is defined above. n is 2 to about 1,000 such as 2 to about 750, 2 to about 500, 2 to about 250, 2 to about 100, about 10 to about 1,000, about 10 to about 750, about 10 to about 500, about 10 to about 250, about 50 to about 1,000, about 50 to about 750, about 50 to about 500, about 50 to about 250, about 100 to about 1,000, about 100 to about 750, about 100 to about 500, about 100 to about 250, or about 250 to about 1,000. m is 2 to about 1,000 such as 2 to about 750, 2 to about 500, 2 to about 250, 2 to about 100, about 10 to about 1,000, about 10 to about 750, about 10 to about 500, about 10 to about 250, about 50 to about 1,000, about 50 to about 750, about 50 to about 500, about 50 to about 250, about 100 to about 1,000, about 100 to about 750, about 100 to about 500, about 100 to about 250, or about 250 to about 1,000. k is 2 to about 1,000 such as 2 to about 750, 2 to about 500, 2 to about 250, 2 to about 100, about 10 to about 1,000, about 10 to about 750, about 10 to about 500, about 10 to about 250, about 50 to about 1,000, about 50 to about 750, about 50 to about 500, about 50 to about 250, about 100 to about 1,000, about 100 to about 750, about 100 to about 500, about 100 to about 250, or about 250 to about 1,000.

II. COMPOSITIONS

It further is contemplated that one or more excipients may be combined with the thionated polymer. In some embodiments, the excipient is a solid, liquid, or a gas. In other embodiments, the excipient is inert, i.e., does not affect the properties or operability of the thionated polymer. In further embodiments, the excipient aids in the operability of the thionated polymer.

Such excipients may include, without limitation, additional components or additives. In some embodiments, the excipient may include pigments, fillers, odor absorber, antioxidants, biocides, antibacterials, fungicides, mildew inhibitors, bonding agents, dispersants, smoke suppressants, lubricants, plasticizers, processing aids, other polymers, stabilizers, ultraviolet light absorbers, viscosity regulators, particles of infrared-transparent materials, or combinations thereof. In some embodiments, the excipient is a particle of an infrared-transparent material such as ZnS, ZnSe, $CaF_2$, Ge, Si and other inorganic infrared or near-infrared transparent materials. One of skill in the art would be able to select a suitable excipient for use herein.

III. FILMS/SUBSTRATES

The thionated polymer may be produced as a film for use herein. One of skill in the art would readily understand how to prepare such films. In some embodiments, the films are prepared by melt-casting, solution casting, or dispersion-casting. In other embodiments, the films are prepared by dispersion casting with further melting if the substrate cannot be heated. In further embodiments, the films are prepared by heating with stream of, e.g., hot air or gas. In yet other embodiments, the films are prepared using an industrial dryer.

The film may be comprised of one layer or of several layers. In some embodiments, the film is comprised of at least one layer of the thionated polymer. In further embodiments, the film is comprised of at least two layers of the thionated polymer. In other embodiments, the film is comprised of at least three layers of the thionated polymer. The layers may be the same or different thicknesses. In some embodiment, each layer independently has a thickness of about 100 µm to about 1 mm. In other embodiments, the layer thickness is about 0.1 to about 10 mm, about 0.5 to about 5 mm, about 1 to about 5 mm, about 1 to about 3 mm, about 0.1 mm to about 5 mm, about 0.5 mm to 1 mm, about 1 mm, about 2 mm, about 3 mm, about 4 mm, or about 5 mm.

Variations and combinations of layering techniques may be utilized based on the desired film, selected excipients, and selected aromatic group. When multiple layers are produced, each layer of the film may be substantially dried prior to depositing the next layer. Alternatively, the layers may be applied to each other in a wet form. The term "substantially dried" means that the layer contains no more than about 10% by weight, based on the total weight of the layer, of a liquid. The time required to dry each or all layers may vary and is dependent upon the aromatic group, solvent(s), among others.

The thionated polymers described herein may be applied to a substrate. The term "substrate" as used herein refers to a template which is temporarily or permanently attached to the thionated polymer. The type of substrate may be selected by one skilled in the art depending on the potential application of the thionated polymer. In one embodiment, the substrate is temporary and not intended to operate with the thionated polymer. In another embodiment, the substrate is permanent and is utilized in conjunction with the thionated polymer. In a further embodiment, the substrate is glass, plastic, metal, or the like. In still another embodiment, the substrate is polystyrene. In other embodiments, the substrate is glass. In other embodiments, the substrate is a semiconductor. In yet further embodiments, the substrate is an optical device such as a lens for a camera, telescope, or night vision goggles. In other embodiments, the substrate is an IR-transparent material.

The thionated polymer may be used in analytic methods. Thus, in some embodiments, the thionated polymers may be used to analyze samples, e.g., oil or gasoline, for chemical compounds contained therein. In doing so, additional steps of removing the chemical compounds from the samples for analysis are not required. Thus, in other embodiments, the thionated polymers may be utilized as a sorbent. The thionated sorbent containing the sample may then be analyzed using a spectrophotometic technique such as FTIR. In some embodiments, the sorbent is analyzed and specific bands of analytes are monitored to determine the chemical content of the sample. Since the thionated polymer lacks absorption bands in analyze region, its use as a sorbent does not interfere with the analysis.

In cases where the thionated polymer is not directly affixed to the substrate when in use, either side of the film may face the substrate. The thionated polymer may also be sandwiched in between 2 substrates such as two pieces of glass (such as panes), plastic, or the like.

Typically, the thionated polymer is applied to the substrate in the form of a film. The film may be applied or affixed to the substrate using techniques known to those skilled in the art. In some embodiments, the films are heated separately and then applied to the substrate. In other embodiments, the thionated polymer is attached to a substrate in a form of an adhesive tape or 3D-printing by casting molten polymer. In yet other embodiments, the thionated polymer attaches to the substrate as an adhesive. In further embodiments, the thionated polymer is applied to a substrate in the form of a film using techniques in the art including melt-casting, solution casting, or dispersion-casting, optionally with heating. One of skill in the art would be able to determine the thickness of the thionated polymer based on the selected polymer, application technique, among others as described above.

IV. PREPARATION PROCESSES

Also provided herein are processes for preparing the thionated polymers. As a first step, a monomer or oligomer comprising one or more aromatic groups is oxidized. The oxidation may be performed using oxidizing agents known to those skilled in the art. In some embodiments, the oxidizing agent is a peroxide such as sodium peroxide. In other embodiments, the oxidizing agent is 3-chloroperbenzoic acid. In further embodiments, the oxidizing agent is a persulfate such as ammonium persulfate. In yet other embodiments, the oxidizing agent is oxygen or air comprising oxygen. The oxidation is optionally performed in the presence of a transition metal complex. when oxygen is utilized in the oxidation In some embodiments, the transition metal complex is a copper complex. In other embodiments, the transition metal complex is copper oxide. In further embodiments, the transition metal complex is an iron-containing salt or oxide such as, e.g., titanium oxide.

The oxidization results in a compound having fully aromatic groups and quinoid fragments that are capable of converting to an aromatic moiety when reacted with sulfur, or an unsaturated precursor of an aromatic compound that converts to an aromatic moiety when reacted with sulfur. In some embodiments, the product of the oxidation results in a compound having the quinoid structure. In further embodiments, the oxidation results in quinoid that is, for example, a benzoquinone such as 1,4-benzoquinone or 1,4-benzoquinonediimine, an emeraldine such as 4-(((1E,4E)-4-((4-aminophenyl)imino)cyclohexa-2,5-dien-1-ylidene)amino)-N-phenylaniline, a naphtha-naphthaceneone such as naphtho (2,1,8-qra)naphthacene-7,12-dione, as anthraquinone such as 1-aminoanthraquinone or 2-aminoanthraquinone, or antracenetetraone such as 1,4,9,10-anthracenetetraone.

The inventors found that double bonds between carbon atoms of quinoid fragments, which are formed as a result of oxidizing of aromatic fragments, participate in the copolymerization with sulfur. In doing so, the quinoid groups interacting with sulfur are reduced to aromatic groups, which are not absorbing in the near-infrared region. See Scheme 1 which shows one embodiment of the invention of oligomers of aromatic compounds utilized to prepare the thionated polymers. The aromatic oligomers interact with oxygen in the air which leads to formation of quinoid fragments, which are reactive towards sulfur.

Scheme 1

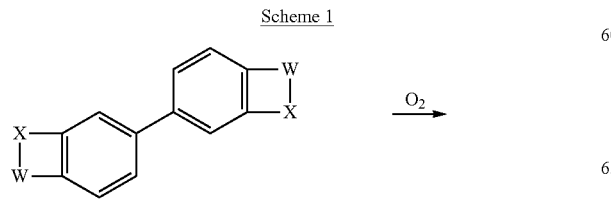

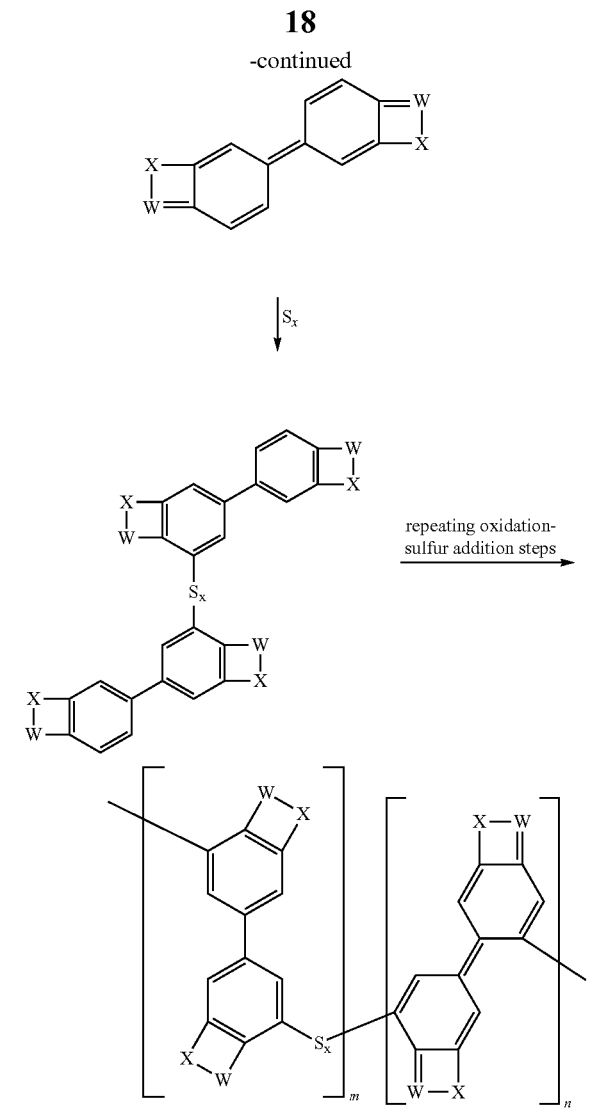

In some embodiments, one or more oxidation step may be omitted is not required if the oligomer contains one or more quinoid fragments or structures. In other embodiments, the oligomer comprises one or more quinoid fragments. The term "quinoid" as used herein refers to an unsaturated precursor of an aromatic group that converts to an aromatic moiety when reacted with $S_x$. See, Scheme 2 which shows the reaction of an pre-oxidized oligomer with sulfur to provide the thionated polymer.

Scheme 2

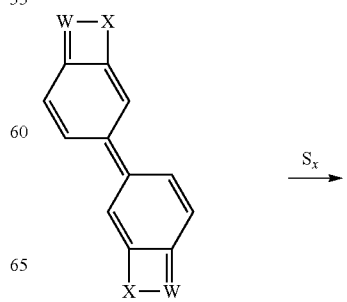

-continued

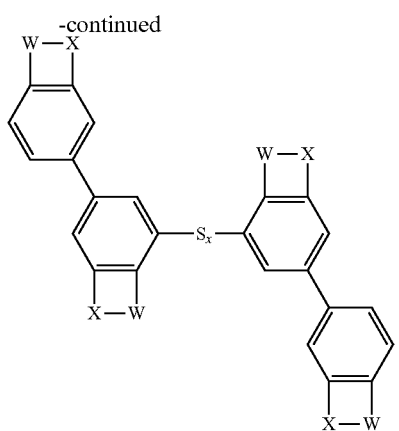

The product of the oxidation is then reduced using a sulfur source. In some embodiments, the sulfur source is elemental sulfur, a metal sulfide, or a compound that decomposes to elemental sulfur under heating. In other embodiments the sulfur source is a polysulfide. Examples of suitable polysulfides include metal sulfides such as $MS_xH$ or $M_2S_x$. In these compounds, M is a metal such as an alkali metal and x is 1 to about 100. In further embodiments, the sulfur source is elemental sulfur. In still other embodiments, the sulfur source is a compound that decomposes to elemental sulfur under heating such as $S_2O$. In yet further embodiments, the sulfur source is a compound that decomposes to elemental sulfur in the presence of alkali metal sulfides such as hydrogen sulfide. In other embodiments, the sulfur sources is a compound that decomposes to elemental sulfur in the presence of an acid such as $Na_2S_2O_3$.

Preferably, the sulfur source is utilized at elevated temperatures by heating the sulfur source. In some embodiments, the sulfur source is heated to a temperature of about 100 to about 200° C., about 110 to about 150° C., or about 120 to about 140° C.

The product of the oxidation may be added to the sulfur source or the sulfur source may be added to the product of the oxidation. Preferably, the product of the oxidation is added to the sulfur source. One of skill in the art would be able to select a suitable reaction temperature. In some embodiments, the reaction temperature is an elevated temperature such as 100 to about 300° C., such as about 120 to about 280° C., about 130 to about 270° C., about 140 to about 260° C., about 150 to about 250° C., about 160 to about 240° C., about 170 to about 230° C., about 180 to about 220° C., about 190 to about 210° C., or about 200° C.

When the process includes an oligomer, the amount of oligomer in the thionated polymer is about 10 to about 50% by weight of oligomer, based on the weight of the thionated polymer. In some embodiments, the thionated polymer contains about 20 to about 40% by weight of oligomer or about 15 to about 40% by weight of oligomer.

The oxidation and thionating steps may be repeated one or more times until the described polymer $M_w$ or size is achieved.

It is also possible to treat the final thionated polymer product in an effort to remove undesirable impurities. In some embodiments, the impurities are removed using extraction. In further embodiments, the impurities are removed using one or more solvents such as chloroform, methylene chloride, toluene, benzene, tetrachloromethane and/or dichlorobenzene. An extractor such as the Soxlet Extractor may be used to facilitate the extraction. In other embodiments, filtration method may be also or alternatively be utilized to remove impurities. In further embodiments, excess unreacted sulfur and unreacted aromatic compounds can be removed by heating under vacuum. Other methods including using specific sorbents, ceramic filters, molecular sieves can also be implemented The temperature, if required, and time required in either step of the process is dependent on the aromatic group, solvent(s), laboratory conditions, among others. The temperature must be low enough, however, to avoid degradation or unwanted reactions of the components of the compositions and/or the final film product. Accordingly, either step in the process may be performed at room or elevated temperatures.

Once the thionated polymer has been prepared, it may be formed into a film by pouring the mixture onto a substrate. In some embodiments, the substrate is one defined above. In other embodiments, the substrate is a temporary substrate and only is used to form the film. In further embodiment, the substrate is an aluminum sheet or foil.

The substrate containing the thionated polymer film is then dried. One of skill in the art would be able to determine the temperature and time required to dry the film. In some embodiments, the film is dried at room temperature. In other embodiments, the film is dried at elevated temperatures such as 50° C. or above, about 60° C. or above, about 70° C. or above, or about 80° C. or above, among others. The final thionated polymer film may then be cooled to ambient temperatures for use herein.

V. ASPECTS

Aspect 1. A thionated polymer, comprising one or more aromatic groups and at least one $S_x$ group, wherein x is 1-200, wherein the thionated polymer contains about 50% by weight, based on the weight of the thionated polymer, or less of substituents on the backbone of the thionated polymer that absorb at a wavelength of about 950 to about 5500 nm.

Aspect 2. The thionated polymer of aspect 1, that is transparent at a wavelength of about 950 to about 5500 nm.

Aspect 3. The thionated polymer of aspect 1 or 2, wherein the thionated polymer substantially lacks one or more fully saturated or acyclic substituents on the backbone of the thionated polymer.

Aspect 4. The thionated polymer of any one of the preceding aspects, wherein the $M_w$ of the thionated polymer is about 500 to about 10,000,000 daltons such as about 1,000 to about 10,000,000 daltons.

Aspect 5. The thionated polymer of any one of the preceding aspects, wherein the thionated polymer is linear.

Aspect 6. The thionated polymer of any one of the preceding aspects, wherein the thionated polymer is cross-linked.

Aspect 7. The thionated polymer of any one of the preceding aspects, wherein each $S_x$ group bridges two aromatic groups.

Aspect 8. The thionated polymer of any one of the preceding aspects, wherein the $S_x$ group is linear.

Aspect 9. The thionated polymer of any one of the preceding aspects, wherein x is 1-100, such as 1-50, 6-20, or 6-8.

Aspect 10. The thionated polymer of any one of the preceding aspects, comprising at least one $S_8$ group.

Aspect 11. The thionated polymer of any one of the preceding aspects, wherein the aromatic group comprises an aryl, a heteroaryl, or a combination thereof.

Aspect 12. The thionated polymer of any one of the preceding aspects, wherein the aromatic group comprises an aryl such as phenyl, naphthyl, anthryl, or fluorenyl.

Aspect 13. The thionated polymer of any one of aspects 1 to 11, wherein the aromatic group comprises a heteroaryl such as azaindolyl, benzo(b)thienyl, benzimidazolyl, benzofuranyl, benzoxazolyl, benzothiazolyl, benzothiadiazolyl, benzotriazolyl, benzoxadiazolyl, furanyl, imidazolyl, imidazopyridinyl, indolyl, indolinyl, indazolyl, isoindolinyl, isoxazolyl, isothiazolyl, isoquinolinyl, oxadiazolyl, oxazolyl, purinyl, pyranyl, pyrazinyl, pyrazolyl, pyridinyl, pyrimidinyl, pyrrolyl, pyrrolo[2,3-d]pyrimidinyl, pyrazolo[3,4-d]pyrimidinyl, quinazolinyl, triazolyl, thiazolyl, thiophenyl, tetrahydroindolyl, tetrazolyl, thiadiazolyl, thienyl, thiomorpholinyl, triazolyl, or tropanyl.

Aspect 14. The thionated polymer of any one of the preceding aspects, wherein the backbone of the thionated polymer further comprises one or more substituent.

Aspect 15. The thionated polymer of any one of the preceding aspects, wherein the substituent is a halogen or a perhalogenated alkyl.

Aspect 16. The thionated polymer of any one of aspects 1 to 14, wherein the substituent comprises a cyclic, aromatic substituent.

Aspect 17. The thionated polymer of aspect 16, wherein the aromatic substituent is aryl, $X^1$-aryl, heteroaryl, or $X^1$-heteroaryl, wherein $X^1$ is O, S, or $NR^1$, wherein $R^1$ is aryl or heteroaryl.

Aspect 18. The thionated polymer of aspect 16, wherein the aromatic substituent comprises one or more heteroatoms.

Aspect 19. The thionated polymer of aspect 18, wherein the aromatic substituent comprises one or more of O, S, or $NR^B$, wherein $R^B$ is aryl or heteroaryl.

Aspect 20. The thionated polymer of aspect 1, wherein the aromatic group is of formula (III):
wherein:

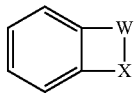

(III)

W—X comprises a 4 to 10-membered carbon-based ring comprising 0-3 heteroatoms;

wherein W—X is optionally fused with a second aromatic group;

wherein any position on the compound of formula (III) is optionally substituted with an aromatic substituent.

Aspect 21. The thionated polymer of aspect 20, wherein W and X are, independently, —C($R^4$)—, —C($R^4$)$_2$—C($R^4$)$_2$—, —C($R^4$)$_2$—C($R^4$)=C($R^4$)—, —N($R^4$)—, —N($R^4$)—C($R^4$)—, —N($R^4$)—C($R^4$)—C($R^4$), —N($R^4$)—C($R^4$)=C($R^4$)—, —O—, —S—, —O—C($R^4$)$_2$—, —S—C($R^4$)$_2$—, —O—C($R^4$)$_2$—C($R^4$)$_2$—, —S—C($R^4$)$_2$—C($R^4$)$_2$—, —O—C($R^4$)=C($R^4$)—, or —S—C($R^4$)=C($R^4$)—, wherein each $R^4$ is, independently, H, aryl, or heteroaryl.

Aspect 22. The thionated polymer of aspect 1, that is of formula (IV):

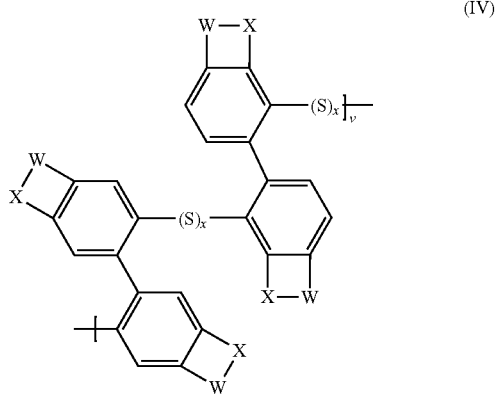

wherein, v is 2 to about 200.

Aspect 23. The thionated polymer of aspect 1, this is of formula (V):

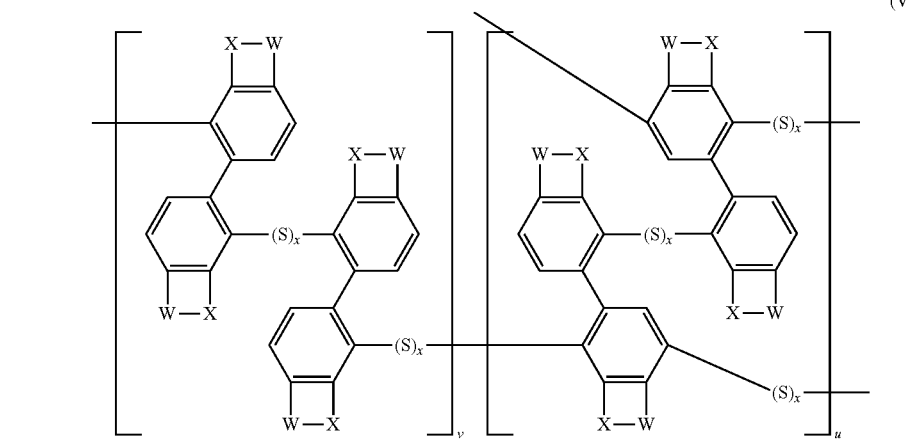

wherein:
v is about 2 to about 500; and
u is about 2 to about 500.
Aspect 24. The thionated polymer of aspect 1, wherein the aromatic group is:
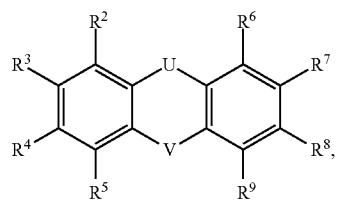
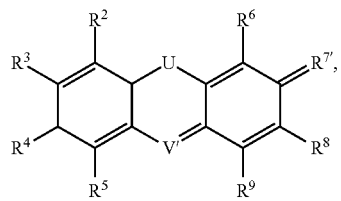
or a combination thereof;
wherein:
U and V are, independently, $CH_2$, O, S, or NH;
V' is CH or N;
$R^2$ to $R^9$ are, independently, H, aryl, or heteroaryl; and
$R^{7'}$ is aryl or heteroaryl.
Aspect 25. The thionated polymer of aspect 1, that is of formula (VI):
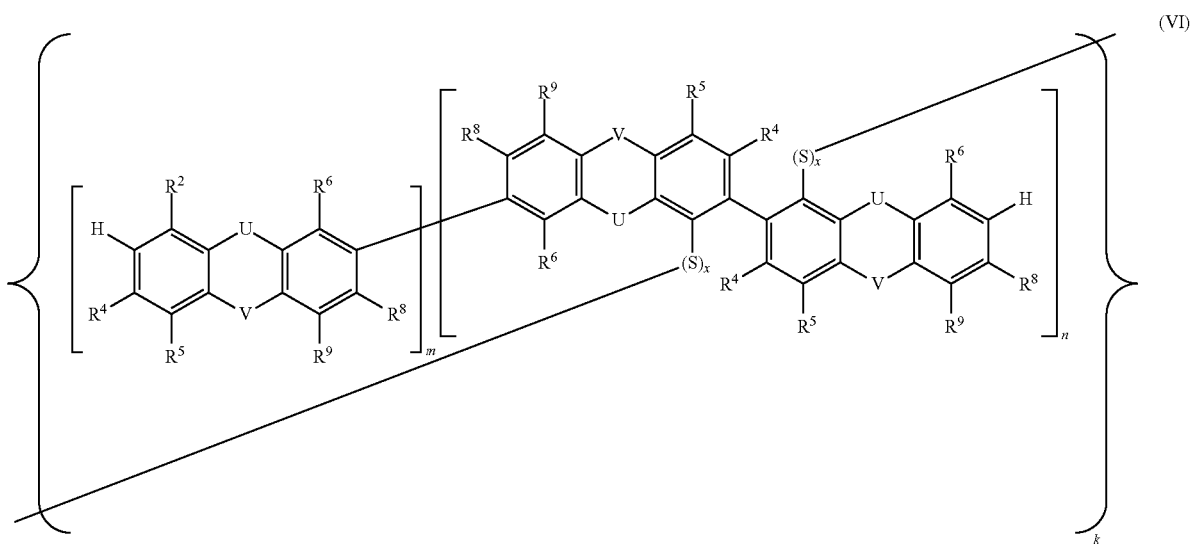

wherein:
U and V are, independently, $CH_2$, O, S, or NH;
V' is CH or N;
$R^2$, $R^4$-$R^6$, $R^8$, and $R^9$ are, independently, H, aryl, or heteroaryl;
n is 2 to about 1,000;
m is 2 to about 1,000; and
k is 2 to about 1,000.

Aspect 26. The thionated polymer of aspect 1, wherein the thionated polymer is of formula (VII):

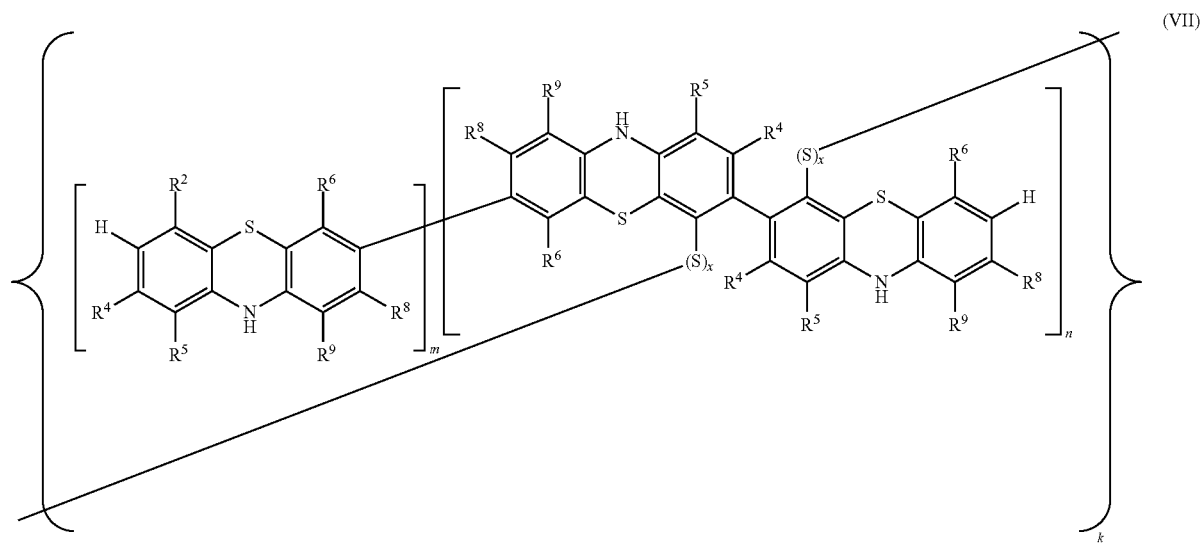

wherein:
$R^2$ to $R^9$ are, independently, H, aryl, or heteroaryl;
n is 2 to about 1,000;
m is 2 to about 1,000; and
k is 2 to about 1,000.

Aspect 27. The thionated polymer of aspect 1, wherein the thionated polymer is of formula (VIII):

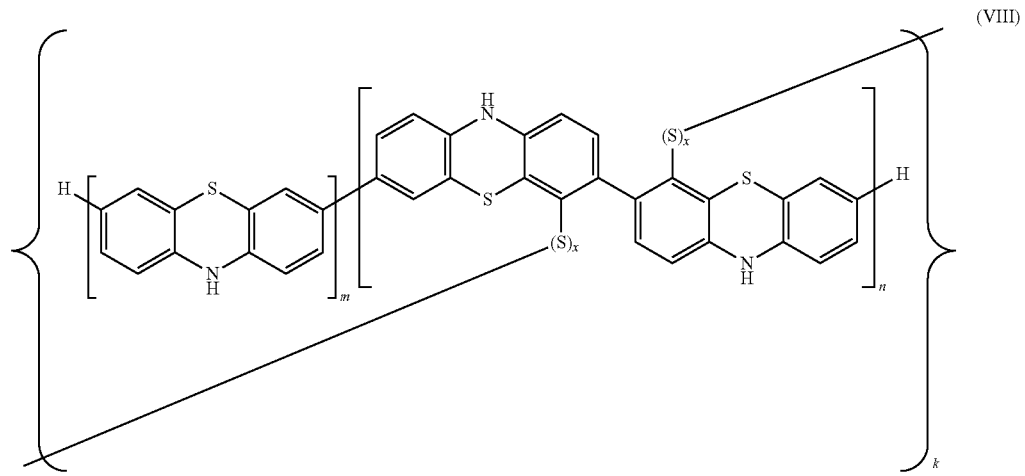

wherein:

m is 2 to about 1,000;

n is 2 to about 1,000, and k is 2 to about 1,000.

Aspect 28. A thionated polymer of any one of the preceding aspects, comprising about 5% by weight or less, based on the weight of the thionated polymer, of a thionated impurity that does not absorb light at the wavelength of the thionated polymer.

Aspect 29. A composition comprising a thionated polymer of any one of the preceding aspects and an excipient.

Aspect 30. The composition of aspect 29, comprising about 1% by weight or less of the thionated impurity.

Aspect 31. The composition of aspect 29 or 30, wherein the thionated impurity is a thionated alkyl group.

Aspect 32. A film comprising a thionated polymer of any one of aspects 1 to 28 or a composition of any one of aspects 29 to 31.

Aspect 33. A glass substrate comprising the film of aspect 32, such as a glass substrate covered with the film of aspect 32.

Aspect 34. An optical device comprising a thionated polymer of any one of aspects 1 to 28, a composition of any one of aspects 29 to 31, a film of aspect 32, or a glass substrate of aspect 33.

Aspect 35. A process for preparing a thionated polymer of any one of aspects 1 to 28, comprising (a) oxidizing a monomer or oligomer comprising one or more aromatic groups; and (b) reducing the product of step (a) with a sulfur source.

Aspect 36. The process of aspect 35, comprising repeating steps (a) and (b).

Aspect 37. The process of aspect 35 or 36, wherein the sulfur source is elemental sulfur, a metal sulfide such as $MS_xH$ or $M_2S_x$ (where M is a metal such as an alkali metal and x is 1 to 100), or a compound that decomposes to elemental sulfur under heating.

Aspect 38. The process of any one of aspects 35 to 37, wherein the oxidizing is performed using a peroxide such as sodium peroxide, 3-chloroperbenzoic acid, a persulfate such as ammonium persulfate, or oxygen, wherein the oxidizing is optionally performed in the presence of a transition metal complex such as a copper complex or copper oxide.

Aspect 39. The process of any one of aspects 35 to 38, wherein the product of step (a) comprises fully aromatic groups.

Aspect 40. The process of any one of aspects 35 to 39, wherein the product of step (a) comprises partially aromatic groups that convert to an aromatic moiety.

Aspect 41. The process of any one of aspects 35 to 40, wherein the monomer or oligomer absorbs less than about 5% of light at a wavelength of about 950 to about 5500 nm.

VI. EXAMPLES

Exemplary compounds will now be described by reference to the illustrative synthetic schemes for their general preparation below and the specific examples that follow. Artisans will recognize that, to obtain the various compounds herein, starting materials may be suitably selected so that the ultimately desired substituents will be carried through the reaction scheme with or without protection as appropriate to yield the desired product. Alternatively, it may be necessary or desirable to employ, in the place of the ultimately desired substituent, a suitable group that may be carried through the reaction scheme and replaced as appropriate with the desired substituent. Reactions may be performed between the melting point and the reflux temperature of the solvent, and preferably between 0° C. and the reflux temperature of the solvent. Reactions may be heated employing conventional heating or microwave heating. Reactions may also be conducted in sealed pressure vessels above the normal reflux temperature of the solvent.

Example 1

Sulfur (10 g) was heated to 120±2° C. while mixing on a magnetic stirrer in an open glass container (diameter 2 cm) using an octagonal teflon-covered magnetic stirring bar. After 3 hours, N-(-4-(naphthalen-1-ylimino)naphthalen-1 (4H)-ylidene)-4-(10H-phenothiazin-10-yl)naphthalen-1-amine and (N,N',N,N')—N,N'-(naphthalene-1,4-diylidene) bis(4-10H-phenothiazin-10-yl)naphthalen-1-amine) with a molecular weight in the range of 597-1000 Dalton (2 g) was added to the sulfur over 30 minutes, and was thoroughly ground in agate mortar. The mixture was heated with mixing for about 5 hours, poured into aluminum foil, placed into oven at 80° C. for 5 hours, and cooled to room temperature over 3 hours. The film thickness was 2±0.1 mm. See, the IR-spectrum in the FIGURE.

This data shows that in the region of 0.67-6.2 the transmittance of the sample is 80-88%, with only several absorption bands distorting the given range at 2.8-3.1 μm, 3.25-3.4 μm, and 3.85-4 μm. Further, there is still a significant transmittance of 65-80% in the range of 5.1-6.2 μm.

Based on these characteristics this material can be used as a protective film, modifying film for optical elements used for near-infrared or mid-infrared ranges or as a glue to join materials used for IR optics.

Example 2

Sulfur that was previously ground in agate mortar (5 g) was heated to 130±2° C. while stirring on a magnetic stirrer in an open glass container (diameter 2 cm) using an octagonal magnetic stirring bar. After 3 hours, 10H,10'H-2,2'-biphenazinylidene (molecular weight not exceeding 420 Dalton) was added in portions over 30 minutes. The mixture was retained at elevated temperature and for 5 hours. The mixture was then poured into aluminum foil, and retained at room temperature (22° C.). The film thickness was 3±0.1 mm.

Example 3

Sulfur that was previously ground in agate mortar (5 g) was heated to 140±2° C. while stirring on a magnetic stirrer in an open glass container (diameter 2 cm) using an octagonal magnetic stirring bar. After 3 hours, 3,3'-biphenothiazinylidene (molecular weight not exceeding 1020 Dalton) was added in portions over 30 minutes. The mixture was retained at elevated temperature and for 5 hours. The mixture was then poured into aluminum foil and was placed in an oven at a temperature 80° C. for 5 hours, and then cooled to room temperature over a period of 3 hours. The film thickness was 4±0.1 mm.

What is claimed is:

1. A thionated polymer, comprising one or more aromatic groups and at least one $S_x$ group, wherein x is 1-200, wherein:

the aromatic group is:

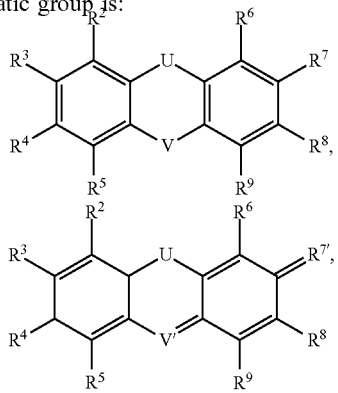

or a combination thereof;
wherein:
U and V are, independently, $CH_2$, O, S, or NH;
V' is CH or N;
$R^2$ to $R^9$ are, independently, H, aryl, or heteroaryl; and
$R^{7'}$ is aryl or heteroaryl.

2. The thionated polymer of claim 1, that is transparent at a wavelength of about 700 to about 6200 nm.

3. The thionated polymer of claim 1, wherein the thionated polymer substantially lacks one or more fully saturated or acyclic substituents on the backbone of the thionated polymer.

4. The thionated polymer of claim 1, wherein the $M_w$ of the thionated polymer is about 500 to about 10,000,000 daltons.

5. The thionated polymer of claim 1, wherein the thionated polymer is linear or cross-linked.

6. The thionated polymer of claim 1, wherein each $S_x$ group bridges two aromatic groups or is linear.

7. The thionated polymer of claim 1, wherein x is 1-100.

8. The thionated polymer of claim 1, comprising at least one $S_8$ group.

9. A thionated polymer, comprising one or more aromatic groups and at least one $S_x$ group, wherein x is 1-200, wherein:
the aromatic group comprises a heteroaryl that is azaindolyl, benzo(b)thienyl, benzimidazolyl, benzofuranyl, benzoxazolyl, benzothiazolyl, benzothiadiazolyl, benzotriazolyl, benzoxadiazolyl, furanyl, imidazolyl, imidazopyridinyl, indolyl, indolinyl, indazolyl, isoindolinyl, isoxazolyl, isothiazolyl, isoquinolinyl, oxadiazolyl, oxazolyl, purinyl, pyranyl, pyrazinyl, pyrazolyl, pyridinyl, pyrimidinyl, pyrrolyl, pyrrolo[2,3-d]pyrimidinyl, pyrazolo[3,4-d]pyrimidinyl, quinolinyl, quinazolinyl, triazolyl, thiazolyl, thiophenyl, tetrahydroindolyl, tetrazolyl, thiadiazolyl, thienyl, thiomorpholinyl, triazolyl, or tropanyl; and
the thionated polymer contains about 50% by weight, based on the weight of the thionated polymer, or less of substituents on the backbone of the thionated polymer that absorb at a wavelength of about 700 to about 6200 nm.

10. The thionated polymer of claim 1, wherein the backbone of the thionated polymer further comprises one or more substituent.

11. The thionated polymer of claim 1, wherein the substituent is a halogen, a perhalogenated alkyl, or a cyclic, aromatic substituent.

12. A thionated polymer, comprising one or more aromatic groups and at least one $S_x$ group, wherein x is 1-200, wherein:
the thionated polymer that is of formula (IV), formula (V), formula (VI), formula (VII), or formula (VIII):
(i) formula (IV):

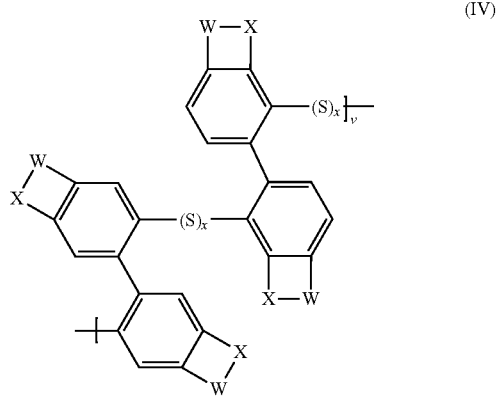

wherein:
v is 2 to about 200;
W—X comprises a 4 to 10-membered carbon-based ring comprising 0-3 heteroatoms and is optionally fused with a second aromatic group;
(ii) formula (V):

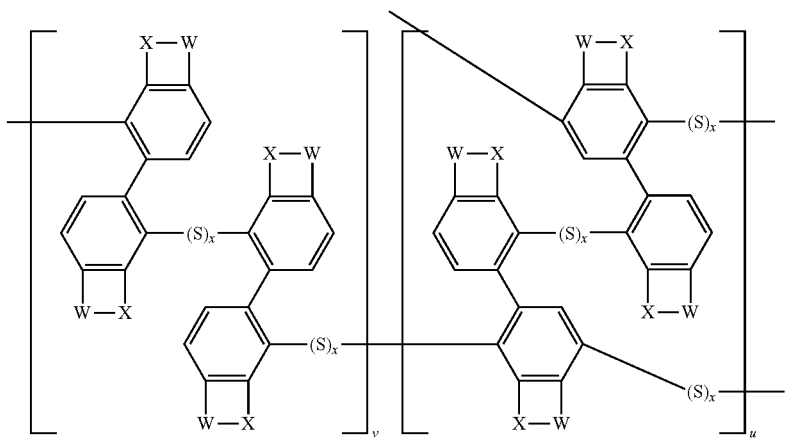

wherein:
  v is about 2 to about 500; and
  u is about 2 to about 500;
(iii) formula (VI):
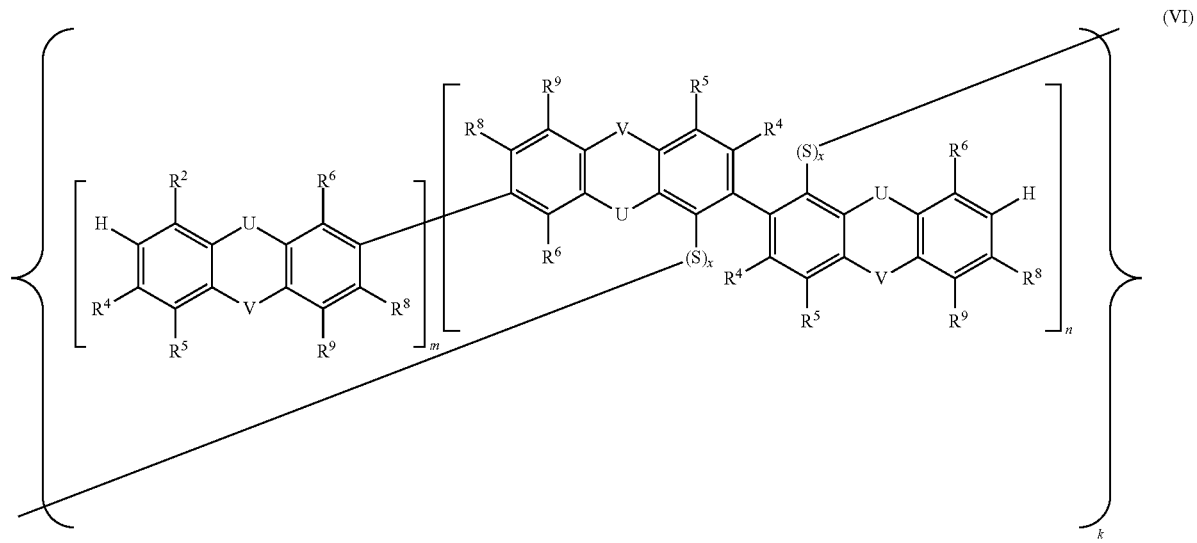
wherein:
  U and V are, independently, $CH_2$, O, S, or NH;
  V' is CH or N;
  $R^2$, $R^4$-$R^6$, $R^8$, and $R^9$ are, independently, H, aryl, or heteroaryl;
  n is 2 to about 1,000;
  m is 2 to about 1,000; and
  k is 2 to about 1,000;
(iv) formula (VII);
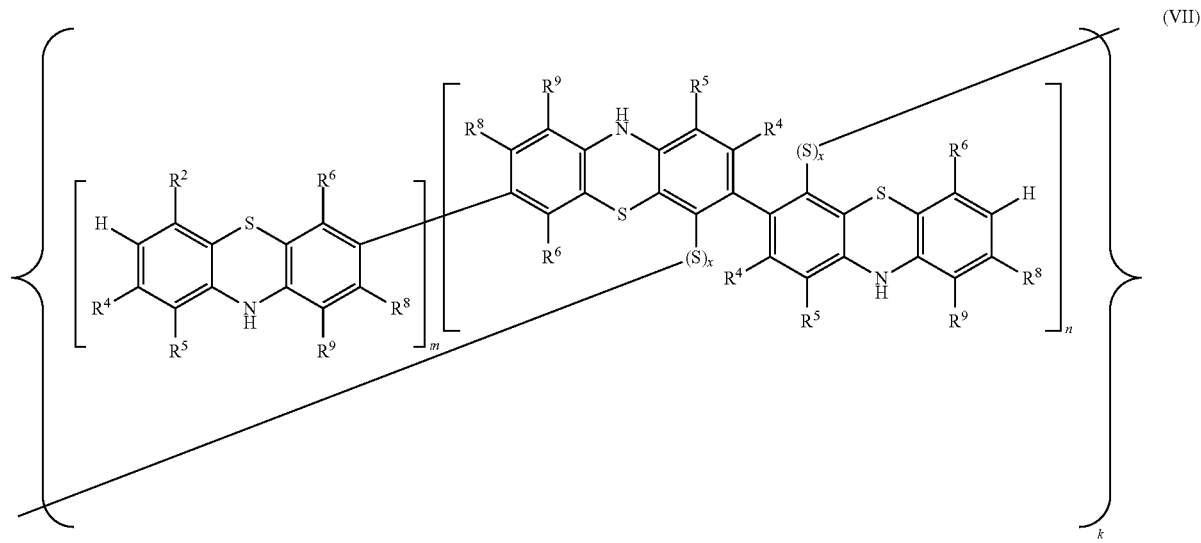

wherein:
R² to R⁹ are, independently, H, aryl, or heteroaryl;
n is 2 to about 1,000;
m is 2 to about 1,000; and
k is 2 to about 1,000; or
(v) formula (VIII):

wherein:
m is 2 to about 1,000;
n is 2 to about 1,000, and
k is 2 to about 1,000;
x is 1-200; and
the thionated polymer contains about 50% by weight, based on the weight of the thionated polymer, or less of substituents on the backbone of the thionated polymer that absorb at a wavelength of about 700 to about 6200 nm.

13. The thionated polymer of claim 1, comprising about 5% by weight or less, based on the weight of the thionated polymer, of a thionated impurity that does not absorb light at the wavelength of the thionated polymer.

14. A composition comprising a thionated polymer of claim 1 and an excipient.

15. A film or optical device comprising a thionated polymer of claim 1.

16. A glass substrate comprising the film of claim 15.

17. A process for preparing a thionated polymer of claim 1, comprising
(a) oxidizing a monomer or oligomer comprising one or more aromatic groups; and
(b) reducing the product of step (a) with a sulfur source.

18. The process of claim 17, wherein the monomer or oligomer absorbs less than about 5% of light at a wavelength of about 700 to about 6200 nm.

19. A thionated polymer, comprising one or more aromatic groups and at least one $S_x$ group, wherein x is 1-200, wherein:
the aromatic group is a phenothiazine; and
the thionated polymer contains about 50% by weight, based on the weight of the thionated polymer, or less of substituents on the backbone of the thionated polymer that absorb at a wavelength of about 700 to about 6200 nm.

20. A substrate comprising an adhesive that is the thionated polymer of claim 1.

21. A film or optical device comprising a thionated polymer of claim 9.

22. A glass substrate comprising the film of claim 9.

23. A substrate comprising an adhesive that is the thionated polymer of claim 9.

24. A film or optical device comprising a thionated polymer of claim 12.

25. A glass substrate comprising the film of claim 12.

26. A substrate comprising an adhesive that is the thionated polymer of claim 12.

* * * * *